United States Patent
Adkins et al.

(10) Patent No.: US 7,567,994 B2
(45) Date of Patent: Jul. 28, 2009

(54) METHOD AND APPARATUS TO PROACTIVELY CAPTURE AND TRANSMIT DENSE DIAGNOSTIC DATA OF A FILE SYSTEM

(75) Inventors: Janet Elizabeth Adkins, Austin, TX (US); Mark Allen Grubbs, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 338 days.

(21) Appl. No.: 11/334,669

(22) Filed: Jan. 18, 2006

(65) Prior Publication Data

US 2007/0174353 A1 Jul. 26, 2007

(51) Int. Cl.
G06F 12/00 (2006.01)
G06F 17/30 (2006.01)
(52) U.S. Cl. ...................................... 707/204; 707/200
(58) Field of Classification Search ................. 707/101, 707/200–209; 714/15
See application file for complete search history.

(56) References Cited

U.S. PATENT DOCUMENTS

| | | |
|---|---|---|
| 5,435,004 A | 7/1995 | Cox et al. |
| 5,953,729 A * | 9/1999 | Cabrera et al. ............. 707/204 |
| 6,078,999 A | 6/2000 | Raju et al. |
| 6,192,376 B1 | 2/2001 | Kincaid et al. |
| 6,377,958 B1 * | 4/2002 | Orcutt ....................... 707/200 |
| 6,604,236 B1 * | 8/2003 | Draper et al. ............... 717/170 |
| 6,877,109 B2 * | 4/2005 | Delaney et al. ................ 714/6 |
| 2005/0108263 A1 * | 5/2005 | Cabrera et al. ............. 707/100 |
| 2006/0174300 A1 * | 8/2006 | Gu et al. .................... 725/100 |

OTHER PUBLICATIONS

Moshe Bar, The JFS Journaling File System, Oct. 2000.*
Vijayan Prabhakaran, Analysis and Evolution of Journaling File Systems, Apr. 2005, USENIX 2005.*
JFS Log, Stephen Best, Proceedings of the 4th Annual Linux Conference, Oct. 2000.*
Incident Response Tools, Holt Sorenson, Oct. 2003.*
Jounral File Systems in Linux, Ricardo Galli, Dec. 2001.*
JFS Overview, Stephen Best, Jan. 2000.*
Journaling File System, Richard Menedetter, published Dec. 15, 2002.*
Vijayan Prabhakaran, Andrea Dusseau, and Remzi Dusseau, Analysis and Evolution of Journaling File Systems, Computer Sciences Department University of Wisconsin, published Apr. 2005.*
U.S. Appl. No. 11/236,450, Adkins et al.
Crocket, "Local Shadowing of Remote File Directory Information", IBM Technical Disclosure Bulletin, Pub. No. 5, 90A 62870/EN8880295, Oct. 1990, pp. 398-400.

* cited by examiner

*Primary Examiner*—James Trujillo
*Assistant Examiner*—Jeffrey A Burke
(74) *Attorney, Agent, or Firm*—Yee & Associates, P.C.; Matthew W. Baca (57) ABSTRACT

An operating system creates a current sparse object in a diagnostic file system. Then the operating system processes a change to data contained in a block. The operating system determines if the change is to a metadata block. The operating system encodes the change in a journal log, in response to a determination that the change is to a metadata block. In addition, the operating system writes the block to the current sparse object, in response to a determination that the change is to a metadata block.

18 Claims, 5 Drawing Sheets

METHOD AND APPARATUS TO PROACTIVELY CAPTURE AND TRANSMIT DENSE DIAGNOSTIC DATA OF A FILE SYSTEM

BACKGROUND OF THE INVENTION

1. Field of the Invention

The present invention relates generally to maintaining and improving file system integrity. More specifically, the present invention relates to a method, apparatus, and computer usable code to obtain file system metadata in a dense format so that such data may be transmitted off-site for expert review and remedies.

2. Description of the Related Art

In computing, a file system is a structure for storing and organizing computer files and the data they contain to make it easy to find and access the files. File systems may use a storage device such as a hard disk or CD-ROM and involve maintaining the physical location of the files. Alternatively, a file system may be a virtual file system. A virtual file system exists only as an access method for virtual data or for data over a network.

File systems are made of two types of data. The first type of data, which usually predominates, is user data. The content type of user data may be, for example, text, graphics, music, and computer instructions. The second type of data is file system metadata. File system metadata is all the data that is not the user data. Metadata informs a processing system of the statistics and structure of the files containing user data.

File system metadata includes a superblock, which provides a file system summary and includes pointers to other information. An inode is file system metadata that is associated with each file. The inode denotes the length of the file in bytes, an associated device identifier, a user identifier, a group identifier, an inode number that may be unique, the file mode, a timestamp, and a reference count.

A block is the smallest unit of disk storage that may be allocated to a file. For example, a processor may establish a block to be 1024 bytes on a particular file system. This means that a file will nearly always fill one or more blocks, with the final block being only part occupied by data.

Parts of a file may reside in numerous blocks, sometimes scattered about a disk drive. An inode may have several blocks listed within the inode. For larger files, an inode may include an indirect block, which may point to a list of additional blocks. Often this leads to a tree-like structure of multiple levels of indirect blocks pointing to successively deeper tiers of blocks.

File systems tend to be very large data structures. When a processor makes changes to the file system, the processor often requires many separate write operations. Occasionally an error or other fault interrupts the sequence of writes, for example, a power failure may occur.

A race condition may happen when a processor encounters an error in this situation. A race condition is what happens when two events in an electronic device essentially race each other to see which influences the device's state or output, wherein the first event or signal to arrive controls the device's state. In the context of file systems, such as a journaling file system, two steps occur when updating the file system: 1) removing a file's directory entry; and 2) marking the file's inode as free space in a free space map.

If power fails and the removing step happens immediately prior to the crash, an orphaned inode will be present, and more of the blocks will appear to be allocated to storage than is actually allocated. If step marking step happens immediately prior to the crash, the not-yet-deleted inode will be marked free and possibly be overwritten by something else.

All journaling file systems have a journal log. The journal log is a place where an operating system writes file metadata in preparation to making a file change to the file system. The purpose is to have a copy of the intended change recorded somewhere, so that recovery of the file system may be performed in the event a power or other failure prevents the file change to actually get written to the file system.

A hazard involved with remotely outsourcing maintenance and recovery of file systems is that transmitted details of the file system may be intercepted. This is especially true when a user transmits data transmitted via the internet. Even encrypted data, once intercepted, may be subject to compromise. Therefore, it would be advantageous to have a method, apparatus, and computer usable program product that avoids transmitting sensitive information over an unsecure network.

SUMMARY OF THE INVENTION

The aspects of the present invention provide a computer implemented method, computer usable code, and apparatus for tracking changes to file system metadata. First, an operating system creates a current sparse object in a diagnostic file system. Then the operating system receives a cluster change referring to a cluster. The operating system determines if the cluster change contains metadata. The operating system writes the cluster change to a journal log, in response to a determination that the cluster change contains metadata. In addition, the operating system writes the cluster to the current sparse object, in response to a determination that the cluster change contains metadata.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION OF THE PREFERRED EMBODIMENT

Figure 1:
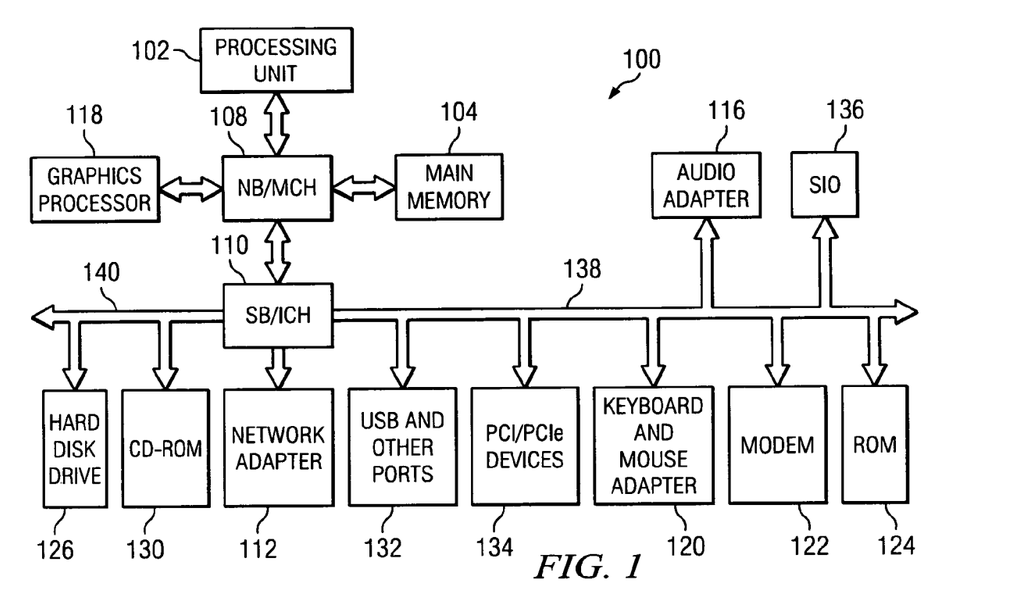
FIG. 1 shows a block diagram of a data processing system in which embodiments of the present invention may be implemented.

With reference now to the figures and in particular with reference to FIG. 1, a block diagram of a data processing system is shown in which embodiments of the present invention may be implemented. In the depicted example, data processing system 100 employs a hub architecture including north bridge and memory controller hub (MCH) 108 and south bridge and input/output (I/O) controller hub (ICH) 110. Processing unit 102, main memory 104, and graphics processor 118 connect to north bridge and memory controller hub 108. Graphics processor 118 may connect to north bridge and memory controller hub 108 through an accelerated graphics port (AGP) or graphics processor 118.

In the depicted example, local area network (LAN) adapter 112, audio adapter 116, keyboard and mouse adapter 120, modem 122, read only memory (ROM) 124, universal serial bus (USB) ports and other communications ports 132, and PCI/PCIe devices 134 connect to south bridge and I/O controller hub 110 through bus 138. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

Hard disk drive 126 and CD-ROM drive 130 connect to south bridge and I/O controller hub 110 through bus 140. Hard disk drive 126 and CD-ROM drive 130 may use, for example, an integrated drive electronics (IDE) or serial advanced technology attachment (SATA) interface. Super I/O (SIO) device 136 may be connected to south bridge and I/O controller hub 110.

An operating system runs on processor 102 and coordinates and controls various components within data processing system 100 in FIG. 1. The operating system may be a commercially available operating system, such as Advanced Interactive executive (AIX®), which is available from IBM Corporation. AIX is a registered trademark of IBM Corporation.

The various embodiments of the present invention permit transmitting of just the particulars of file system inconsistency without the bother of transmitting cumbersome user data. The user data tends to comprise the majority of file system data. Consequently, the embodiments eliminate the vast majority, if not all of the user data, prior to sending. An operating system writes data to a file system internally to identify a plurality of units of data in the file system. The operating system does this when the operating system accesses any particular unit of data. Some embodiments may use units of data as small as blocks. Other embodiments may use larger units of data, for example, sectors. If a unit of data contains file system control structures or metadata, then the software writes or otherwise tracks the changes in the unit of metadata to a diagnostic file, which may be a part of the diagnostic file system. If a unit of data contains user data, then the software does not write or copy the unit of data. This results in a sparse diagnostic file object. A sparse object is one where the operating system skips writing some logical blocks onto physical storage. When the operating system later reads those unallocated blocks, the operating system creates an empty block in memory. Furthermore, when reading from storage, the operating system returns the empty block to the reader, rather than actually reading data from physical storage. In this embodiment, later steps to backup or otherwise consolidate the sparse diagnostic file can very efficiently compress these sparse areas of the diagnostic file. Consequently, a processing system may transmit a sparse object in a vastly reduced form as compared to the source file system.

Figure 2:
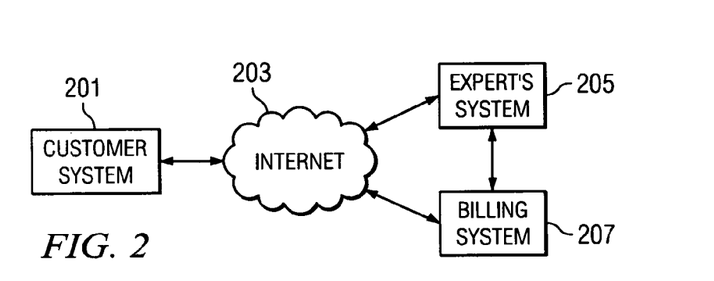
FIG. 2 shows how a customer system may interact with an expert's system in accordance with an illustrative embodiment of the present invention.

FIG. 2 shows how customer system 201 may interact with expert's system 205 in accordance with an illustrative embodiment of the present invention. Customer system 201 may operate using, for example, processing system 100 of FIG. 1. An administrator may determine that a file system is behaving anomalously. In response, an administrator may operate customer system 201 to generate a dense diagnostic file containing dense diagnostic data.

Expert's system 205 may receive a diagnostic file system from customer system 201. Expert's system 205 services the diagnostic file system to form a serviced file system. Expert's system 205 may operate using, for example, processing system 100 of FIG. 1. Servicing may include, for example, performing maintenance on the diagnostic file system to form the serviced file system. In addition, servicing may include performing recovery actions on the diagnostic file system. Billing system 207 may monitor activity on the diagnostic file system. Billing system 207 may monitor activity on expert's system 205 so that billing system 207 may bill the customer for services provided in servicing the diagnostic file system. Expert system 205 returns the serviced file system to customer system 201.

A dense file format is the outcome of a compression of a sparse file. The embodiments of the invention reduce the user data as will be described below. Since a processor may reduce the user data to the point of hiding even the type of content stored therein, the resultant file or files are dense with metadata that concerns, more directly, the source of file system errors. Thus, the term dense diagnostic data is applied to describe the compacted file or files that result from the various illustrative embodiments of the present invention. In other words, dense diagnostic data is created following discarding user data or using place-keepers instead of user data, then compressing the resultant file or files.

Customer system 201 transmits the dense diagnostic data via a network, for example, Internet 203. The dense diagnostic data arrives at expert's system 205. Expert's system 205 may be under the control of a data recovery specialist. The data recovery specialist may not have an established trust relationship with the administrator. In addition, Internet 203 is known to be an insecure means of transmitting data.

Figure 3:
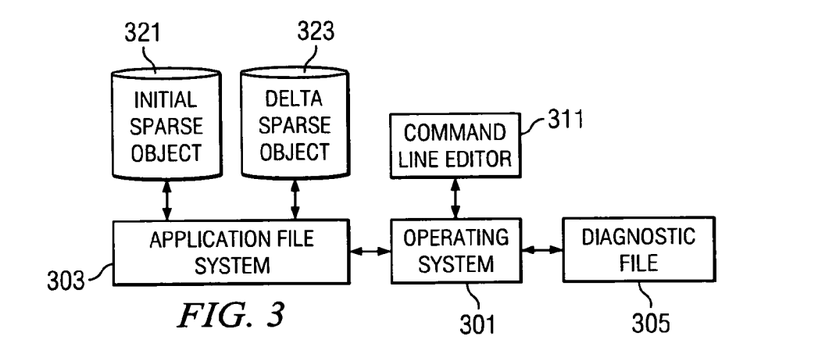
FIG. 3 shows the operation of an operating system to mediate the transformation of an application file system to a diagnostic file in accordance with an illustrative embodiment of the present invention.

FIG. 3 shows the operation of an operating system to mediate and track the transformation of a source file system to a diagnostic file in accordance with an illustrative embodiment of the present invention. Operating system 301 may run on processor, for example, processor 102 of FIG. 1. Application file system 303 or application file system may be stored on, for example, hard disk drive 126 of FIG. 1. An administrator enters commands individually to operating system 301 using command line editor 311. The operating system 301 processes one or more of the commands to generate diagnostic file 305. In addition, a utility program may be used in place of the command line editor 311, wherein the utility program writes commands to the operating system. An embodiment of the present invention accumulates metadata history in one or more sparse objects thus tracking changes almost as they occur. The sparse objects may include initial sparse object 321. Initial sparse object 321 is a sparse object that stores the state of application file system 303 at some time. Operating system 301 may create additional sparse objects, for example, delta sparse object 323, wherein each additional sparse object stores changes from the prior initial sparse object 321 and any additional delta sparse objects. Initial sparse object 321 and delta sparse object 323 are a set of sparse objects. The delta sparse object may be called a current sparse object until the operating system creates an additional delta sparse object, wherein the new delta sparse object becomes the current sparse object.

Figure 4A:
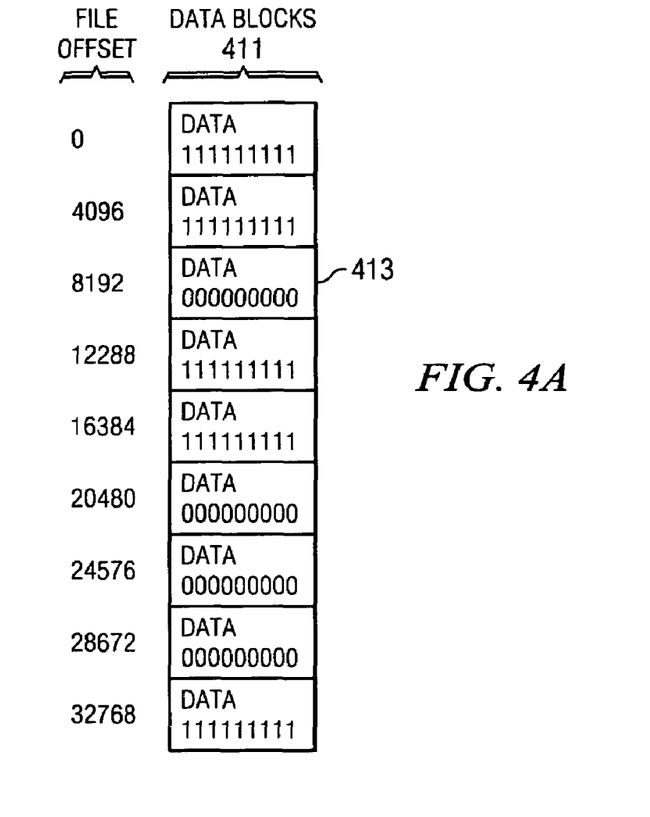
FIG. 4A shows an example of a traditional file format in accordance with an illustrative embodiment of the present invention.

FIG. 4A shows an example of a traditional file format. The operating system sets each bit to '0' that is allocated to file 411 even if a file pointer passes over the physical disk address using a seek command, for example, '0' block 413. In this format, a processor physically writes all allocated bits and blocks of a file, and no compression is employed at the physical level.

Figure 4B:
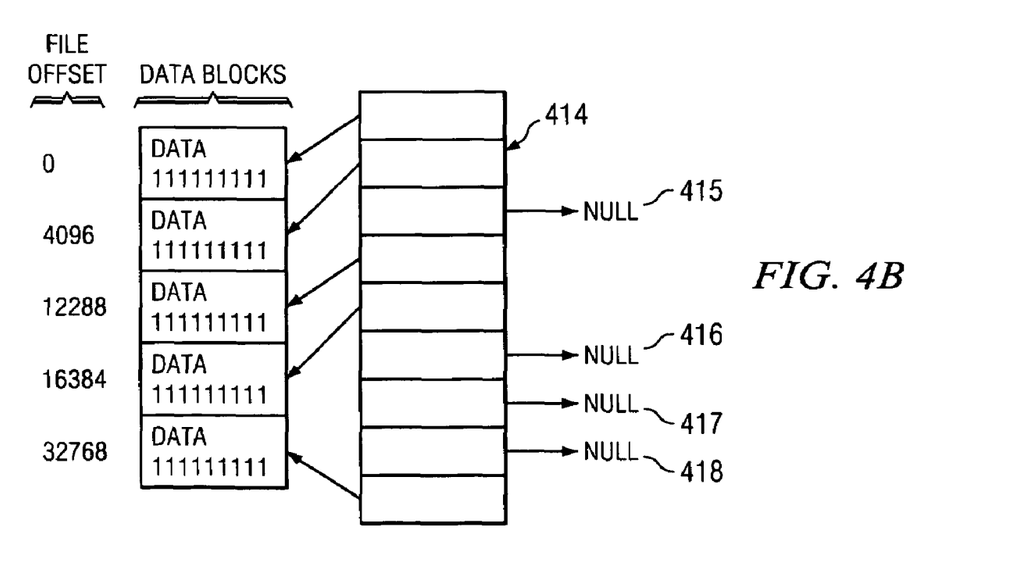
FIG. 4B shows an example of the sparse file format in accordance with an illustrative embodiment of the present invention.

FIG. 4B shows an example of the sparse file format, sometimes called a sparse object, which may be associated with a diagnostic file. This format involves a processor performing a logical write of each bit, but in practice, the processor physically stores data only where the file pointer indicates. A file pointer is a location where a next physical write is to occur. Where a processor permits gaps to exist between file writes, the processor adds a notation in metadata, for example, block pointer table 414. The processor makes a notation to block pointer table 414 by establishing null pointers 415, 416, 417, and 418 where a block of '0's is logically recorded. In other words, each null pointer operates as a kind of place holder for the block of '0's that would otherwise by physically written to the hard drive. The format is sparse because large tracts of '0's may be retrieved on subsequent reads. Moreover, file metadata is the place where the processor keeps references to each '0' block, rather than storing tracts of '0's in the user-data. Tracts of '0's, or '0' blocks are represented by the sparse object, and some file systems may read from the sparse object a large tract of '0's during the ordinary operation of the operating system, for example, when a program calls upon the operating system to read.

When a processor compresses a sparse file, the processor creates a dense file format. A processor may compress each '0' block significantly. Data comprised of somewhat random sequences of '1's and '0's are compressed as well, though, perhaps not as much. Thus, the processor compresses the '0' blocks together with the somewhat random data such that all of a file is physically written in compressed form. A file or files that originate as diagnostic data may become dense diagnostic data once the compression is complete.

Figure 5A:
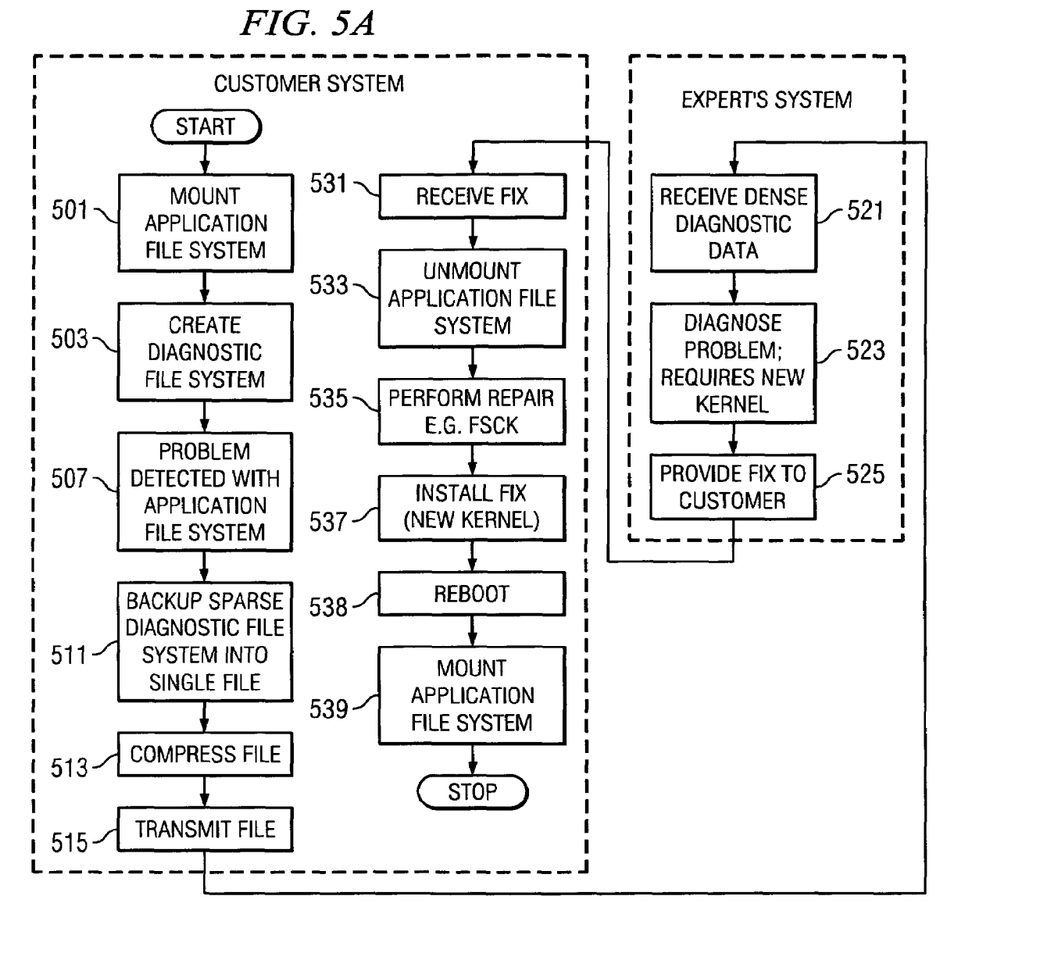
FIG. 5A shows a timeline of steps that a customer may perform in relation to a file system that is experiencing errors requiring a new kernel in accordance with an illustrative embodiment of the present invention.

FIG. 5A shows a timeline of steps that a customer may perform in relation to a file system that is experiencing errors. FIG. 5A also shows steps that a recovery specialist may perform at an expert's system. The expert's system may be expert's system 205 of FIG. 2, for example. Initially, a customer mounts an application file system 501. The application file system may be, for example, application file system 303 of FIG. 3. The customer creates a diagnostic file system 503, which may include mounting the diagnostic file system. For example, the application file system and the diagnostic file system may be supported on hard disk drive 126 of processor 100 of FIG. 1. The customer may instruct the operating system to begin recording metadata history. The operating system may be, for example, operating system 301 of FIG. 3.

For example, a user may command the operating system to record metadata history by setting appropriate flags to a modified mount command as set forth in Table 1 below.

TABLE 1

| Command | Flags and parameters |
|---------|----------------------|
| mount   | -0 metacapture=/newfs <filesystem> |

In Table 1, "/newfs" denotes a path to the initial sparse object and any delta sparse objects.

Eventually, the customer detects a problem with the application file system 507 through the operation of the operating system, for example, a kernel. A customer backs up all sparse objects of the diagnostic file system into a single file 511. The customer may compress the single file 513. The customer may transmit the resultant compressed file 515.

Alternatively, the steps from 511 to 515 may be implemented by a utility program wherein the utility program writes commands to the operating system. In general, the steps from 511 to 515 accomplish the general function of creating a data structure that is smaller and easier to transfer over a network or via other means. When an operating system compresses, that means that the processor takes advantage of repetition and redundancy to summarize the data and store the shortened summary. For example, another way to describe a block of 4096 '0's other than showing all 4096 '0's is to simply store electronically 4096×0, which is much shorter. In addition, since a null pointer may already exist in the metadata, simply storing the null pointer operates as compression. Even a large sequence of null pointers may be compressed. For example, another way to describe a sequence of 1000 null pointers, other than physically storing each of the null pointers, is to store electronically 1000× null. Operating system then transmits the compressed file or dense diagnostic data (step 515) responsive to customer commands. Thus, an operating system may convert a diagnostic file system into to dense diagnostic data. Steps 511-515 may be executed in a common program when the customer initiates backup of the diagnostic files system at step 511.

FIG. 5A continues the process wherein the expert's system 205 in FIG. 2 receives 521 the dense diagnostic data. Customer may permit the application file system to continue operating in a degraded mode at this time. A recovery specialist diagnoses the problem, for example, as requiring a new kernel 523. This activity could take hours or days to complete following receiving the dense diagnostic data. The recovery specialist reports to the customer the details of a fix, and may provide human executable instructions and computer executable instructions to attempt to correct the problem 525. A new kernel installation is a relatively heavy fix. The recovery specialist instructs the customer to unmount the file system as a step to accomplish the fix.

Customer receives fix 531. Customer unmounts the application file system 533. The operating system halts collecting data to the metadata history file during intervals where the application file system is unmounted. The customer executes additional steps to perform the repair 535, for example, customer may run fsck in accordance with a recommendation of the recovery specialist. In addition, the customer may install a fix; for example, install a new kernel (step 537). The customer reboots the computer system 538. The customer mounts the application file system 539.

Figure 5B:
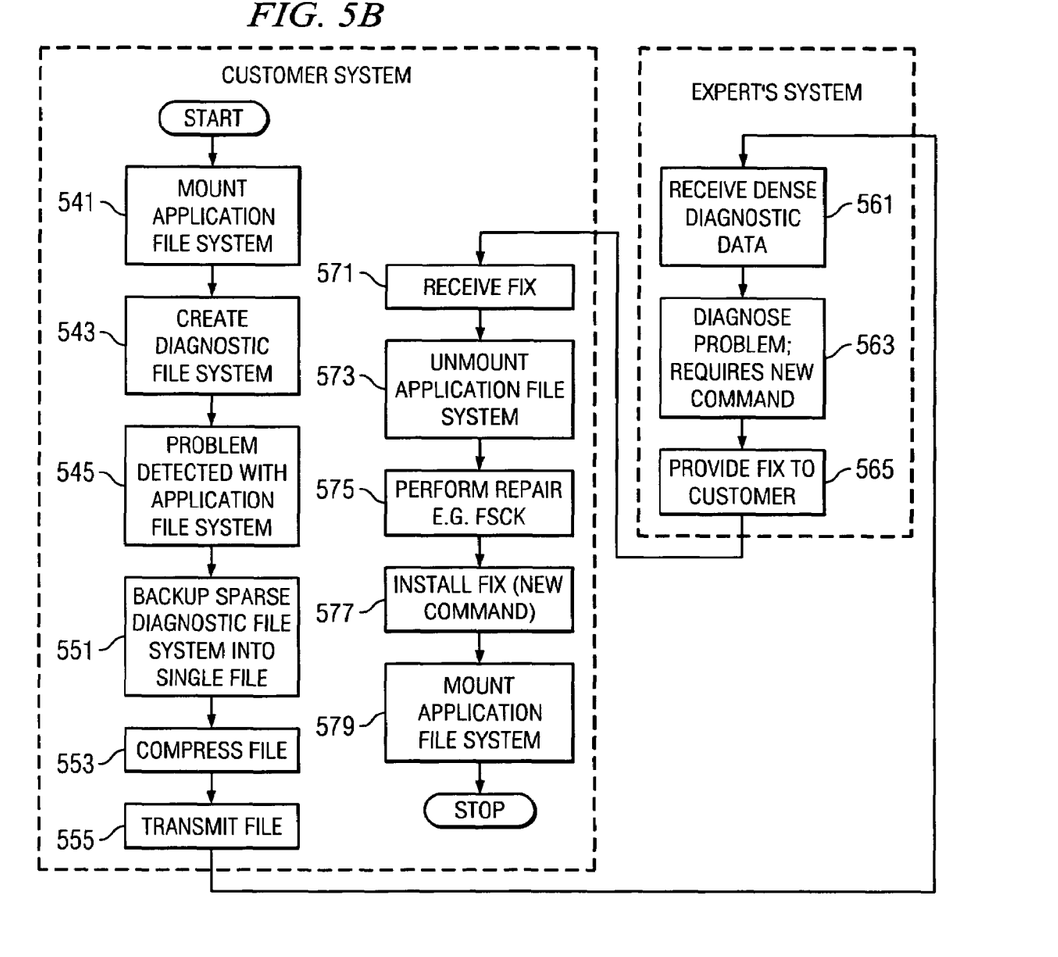
FIG. 5B shows a timeline of steps that a customer may perform in relation to a file system that is experiencing errors requiring a new command in accordance with an illustrative embodiment of the present invention.

FIG. 5B shows a timeline of steps that a customer may perform in relation to a file system that is experiencing errors. FIG. 5B also shows steps that a recovery specialist may perform at an expert's system. The expert's system may be expert's system 205 of FIG. 2, for example. Initially, a customer mounts an application file system 541. The application file system may be, for example, application file system 303 of FIG. 3. The customer creates a diagnostic file system 543, which may include mounting the diagnostic file system. For example, the application file system and the diagnostic file system may be supported on hard disk drive 126 of processor 100 of FIG. 1. The customer may instruct the operating system to begin recording metadata history. The operating system may be, for example, operating system 301 of FIG. 3.

For example, a user may command the operating system to record metadata history by setting appropriate flags to a modified mount command as set forth in Table 1 above.

Eventually, the customer detects a problem with the application file system 545 through the operation of the kernel. A customer backs up all sparse objects of the diagnostic file system into a single file 551. The customer may compress single file 553. The customer may transmit the resultant compressed file 555.

Alternatively, a utility program wherein the utility program writes commands to the operating system may implement the steps from 551 to 555. In general, the steps from 551 to 555 accomplish the general function of creating a data structure that is smaller and easier to transfer over a network or via other means. Operating system then transmits the compressed file or dense diagnostic data (step 555) responsive to customer commands. Thus, an operating system may convert a diagnostic file system into to dense diagnostic data. Steps 551-555 may be executed in a common program when the customer initiates backup of the diagnostic files system at step 551.

A user may perform steps 541-555 in similar fashion as steps 501-515 of FIG. 5A, even though the root problem detected at step 545 may vary somewhat from that problem found in step 507.

FIG. 5B continues the process wherein the expert's system 205 in FIG. 2 receives 561 the dense diagnostic data. The customer may permit the application file system to continue operating in a degraded mode at this time. A recovery specialist diagnoses the problem, for example, as requiring a new command 563. This activity could take hours or days'to complete following receiving the dense diagnostic data. The recovery specialist reports to the customer the details of a fix, and may provide human executable instructions and computer executable instructions to attempt to correct the problem 565.

Customer receives fix 571. Customer unmounts the application file system 573. The operating system halts collecting data to the metadata history file during intervals where the application file system is unmounted. The customer executes additional steps to perform the repair 575, for example, customer may run fsck in accordance with a recommendation of the recovery specialist. In addition, the customer may install a fix, for example, new command (step 577). The customer mounts the application file system 579.

Figure 6A:
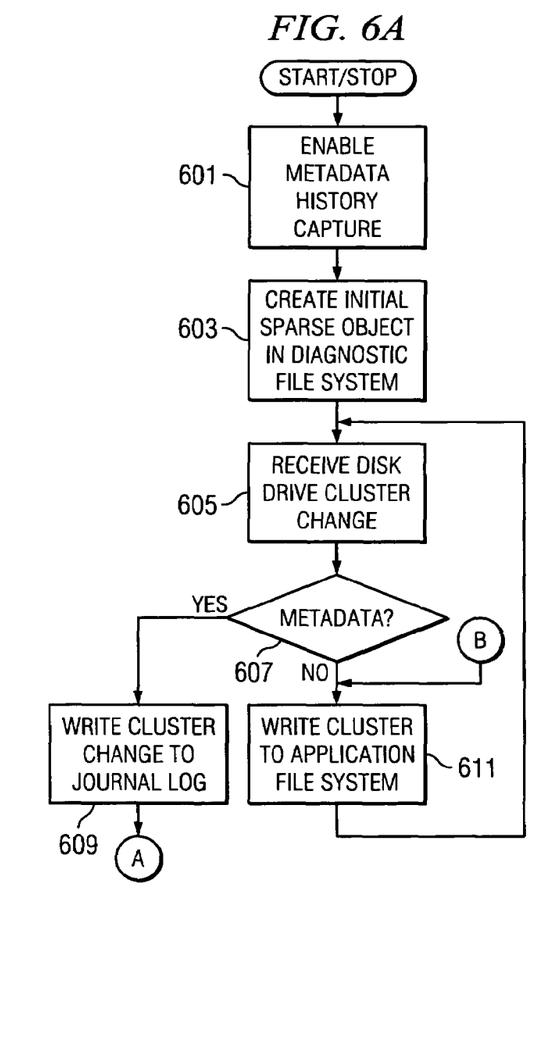
FIG. 6A shows operating system steps to create and maintain a record of changes that have occurred with respect to the file system metadata in accordance with an illustrative embodiment of the present invention.

FIG. 6A shows operating system steps to create and maintain a record of changes that have occurred with respect to the file system metadata. An operating system may perform the steps of FIG. 6A. The operating system may be, for example, operating system 301 of FIG. 3. A customer may enable metadata history capture by making a command to capture metadata history at a command line editor or including a flag on a mount command, as shown in Table 1. Operating system 301 receives the enable metadata history command (step 601). With respect to the application file system, operating system 301 creates an initial sparse object in a diagnostic file system (step 603). Both steps 601 and 603 may be performed by operating system 301 in response to a customer's entered commands, for example, as occur, for example, during timeline steps 503 and 543, respectively, in FIGS. 5A and 5B. The initial sparse object is a current sparse object.

In the ordinary course of an application file system's operation, the operating system receives an event, for example, a cluster change referring to a cluster (step 605). A cluster is a unit of data that may be as small as a block, or as large as several sectors. A cluster change identifies the cluster and data to replace data already stored to the cluster. The cluster change may optionally include an offset into the cluster to indicate where changes begin to occur. An event is any change in the organization of a storage device, such as, for example, disk drive 126 of FIG. 1. The operating system determines if the cluster change comprises metadata (step 607). Operating system 301 identifies a change to the metadata in the file system. Operating system 301 does this by writing the cluster change to a journal log in response to a determination that the cluster change contains metadata (step 609). That is, step 609 occurs in response to a change in the metadata.

Figure 6B:
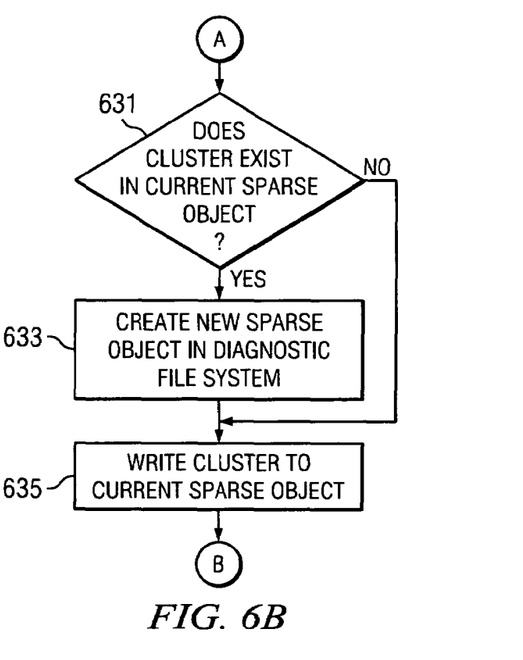
FIG. 6B shows steps to create sparse objects on the basis of cluster changes in accordance with an illustrative embodiment of the present invention.
Figure 6C:
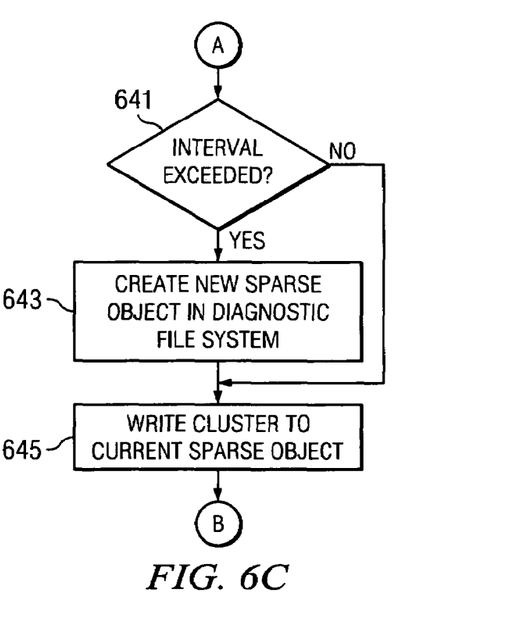
FIG. 6C shows steps to create sparse objects on the basis of an expiring interval in accordance with an illustrative embodiment of the present invention.

An incident is a determination that either a cluster is in a current sparse object or a determination that an interval has expired. The interval may expire when the operating system creates a sparse object and a pre-determined time runs out following the operating system creating the sparse object. FIG. 6B and FIG. 6C show alternate embodiments that operate in response to an incident occurring.

FIG. 6B shows an illustrative embodiment of the invention that creates sparse objects on the basis of cluster changes including an existing sparse object. Initially, operating system 301 determines if the cluster exists in a current sparse object (step 631). Operating system creates a sparse object in the diagnostic file system to form a current sparse object in response to a determination that the cluster is described in the current sparse object (step 633). The operating system then updates a set of sparse objects by writing the cluster to the current sparse object (step 635).

FIG. 6C shows an illustrative embodiment of the invention that creates sparse objects on the basis of an interval expiring. Initially the operating system determines if an interval has expired since the creation of the current sparse object (step 641). Step 641 follows after step 609 from FIG. 6A in this illustrative embodiment of the present invention. Operating system creates a sparse object in the diagnostic file system to form a current sparse object in response to a determination that the interval has expired (step 643). The operating system then updates a set of sparse objects by writing the cluster to the current sparse object (step 645). The interval may be preset through the operation of a mount command, for example, the mount command of Table 1.

FIG. 6A shows the resumption of steps that follow the steps shown in FIG. 6B or FIG. 6C, wherein the steps are common to both illustrative embodiments of the present invention. The operating system writes the cluster to the application file system (step 611). Upon exiting step 611, the operating system may continue processing by resuming at step 605.

Thus, the aspects of the present invention provide a computer implemented method, apparatus, and computer usable program code to accumulate sparse objects to capture at least small increments of change. Such an accumulation of changes, in the form of sparse objects, may permit specialists to detect a detailed pattern in the changes. The pattern may be so detailed as to enhance diagnosis and implementation to correct subtle underlying defects to a file system.

The invention can take the form of an entirely hardware embodiment, an entirely software embodiment or an embodiment containing both hardware and software elements. In a preferred embodiment, the present invention is implemented in software, which includes, but is not limited to, firmware, resident software, microcode, etc.

Furthermore, the present invention can take the form of a computer program product accessible from a computer-usable or computer-readable medium providing program code for use by, or in connection with, a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The illustrated embodiment of the present invention was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically tracking changes in metadata for a file system, the computer implemented method comprising:
   responsive to an event, identifying a change in the metadata in the file system;
   updating a set of sparse objects with the change in the metadata, wherein the set of sparse objects tracks changes in the metadata, wherein the set of sparse objects includes at least one of an initial sparse object and at least one of a plurality of delta sparse objects, wherein units of data in the file system containing file system control structures are written to the initial sparse object, wherein units of data in the file system containing metadata are written to one of the plurality of delta sparse objects, and wherein units of data in the file system containing user data are not copied to any sparse object;
   compressing the set of sparse objects to form dense diagnostic data, wherein a sparse object comprises a number of null pointers, and wherein the number of null pointers are compressed when the set of sparse objects are compressed to form the dense diagnostic data; and
   transmitting the dense diagnostic data to another system.

2. The computer implemented method of claim 1 further comprising:
   detecting an incident; and
   updating the set of sparse objects with the change in the metadata in response to the incident.

3. The computer implemented method of claim 2, wherein the incident is a determination that a cluster exists in a current sparse object.

4. The computer implemented method of claim 2, wherein the incident is an interval expiring in a current sparse object, and wherein the interval expires responsive to a pre-determined time following the creation of the current sparse object.

5. The computer implemented method of claim 1, wherein the event is a periodic event.

6. The computer implemented method of claim 1, wherein the event is the change in the metadata.

7. A data processing system comprising:
   a bus;
   a storage device connected to the bus, wherein computer usable code is located in the storage device;
   a communication unit connected to the bus;
   a processing unit connected to the bus, wherein the processing unit executes the computer usable code to, responsive to an event, identify a change in the metadata in the file system; update a set of sparse objects with the change in the metadata, wherein the set of sparse objects tracks changes in the metadata, wherein the set of sparse objects includes at least one of an initial sparse object and at least one of a plurality of delta sparse objects, wherein units of data in the file system containing file system control structures are written to the initial sparse object, wherein units of data in the file system containing metadata are written to one of the plurality of delta sparse objects, and wherein units of data in the file system containing user data are not copied to any sparse object; compress the set of sparse objects to form dense diagnostic data, wherein a sparse object comprises a number of null pointers, and wherein the number of null pointers are compressed when the set of sparse objects are compressed to form the dense diagnostic data; and transmit the dense diagnostic data to another system.

8. The data processing system of claim 7, wherein the processing unit further executes the computer usable code to detect an incident; and update the set of sparse objects with the change in the metadata in response to the incident.

9. The data processing system of claim 8, wherein the incident is a determination that a cluster exists in a current sparse object.

10. The data processing system of claim 8, wherein the incident is an interval expiring in a current sparse object, and wherein the interval expires responsive to a pre-determined time following the creation of the current sparse object.

11. The data processing system of claim 7, wherein the event is a periodic event.

12. The data processing system of claim 7, wherein the event is the change in the metadata.

13. A computer program product comprising a computer readable storage medium having computer usable program code for tracking changes in file system metadata, said computer program product including;

computer usable program code for, responsive to an event, identifying a change in the metadata in the file system;

computer usable program code for updating a set of sparse objects with the change in the metadata, wherein the set of sparse objects tracks changes in the metadata, wherein the set of sparse objects includes at least one of an initial sparse object and at least one of a plurality of delta sparse objects, wherein units of data in the file system containing file system control structures are written to the initial sparse object, wherein units of data in the file system containing metadata are written to one of the plurality of delta sparse objects, and wherein units of data in the file system containing user data are not copied to any sparse object;

computer usable program code for compressing the set of sparse objects to form dense diagnostic data, wherein a sparse object comprises a number of null pointers, and wherein the number of null pointers are compressed when the set of sparse objects are compressed to form the dense diagnostic data; and     computer usable program code for transmitting the dense diagnostic data to another system.

14. The computer program product of claim 13, wherein the computer usable program code further comprises:

computer usable program code for detecting an incident; and     computer usable program code for updating the set of sparse objects with the change in the metadata in response to the incident.

15. The computer program product of claim 14, wherein the incident is a determination that a cluster exists in a current sparse object.

16. The computer program product of claim 14, wherein the incident is an interval expiring in a current sparse object, and wherein the interval expires responsive to a pre-determined time following the creation of the current sparse object.

17. The computer program product of claim 13, wherein the event is a periodic event.

18. The computer program product of claim 13, wherein the event is the change in the metadata.

\* \* \* \* \*